United States Patent
Patel et al.

(10) Patent No.: US 10,464,518 B2
(45) Date of Patent: Nov. 5, 2019

(54) VEHICLE AIRBAG SYSTEM

(71) Applicant: Ford Global Technologies, LLC, Dearborn, MI (US)

(72) Inventors: Deepak Patel, Canton, MI (US); Zhibing Deng, Northville, MI (US); Brian Robert Spahn, Plymouth, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 129 days.

(21) Appl. No.: 15/702,679

(22) Filed: Sep. 12, 2017

(65) Prior Publication Data

US 2019/0077356 A1    Mar. 14, 2019

(51) Int. Cl.
| | |
|---|---|
| *B60R 21/216* | (2011.01) |
| *B60R 21/207* | (2006.01) |
| *B60R 21/231* | (2011.01) |
| *B60R 21/215* | (2011.01) |
| *B60R 21/2338* | (2011.01) |

(52) U.S. Cl.
CPC ......... *B60R 21/216* (2013.01); *B60R 21/207* (2013.01); *B60R 21/231* (2013.01); *B60R 2021/2076* (2013.01); *B60R 2021/2078* (2013.01); *B60R 2021/2161* (2013.01); *B60R 2021/2163* (2013.01); *B60R 2021/21525* (2013.01); *B60R 2021/23153* (2013.01); *B60R 2021/23386* (2013.01)

(58) Field of Classification Search
CPC ............. B60R 21/231; B60R 21/207; B60R 2021/23153
See application file for complete search history.

(56) References Cited

U.S. PATENT DOCUMENTS

| | | | | |
|---|---|---|---|---|
| 3,514,124 A | * | 5/1970 | Richardson | B60R 21/205 |
| | | | | 280/728.1 |
| 5,738,368 A | * | 4/1998 | Hammond | B60N 2/68 |
| | | | | 280/730.1 |
| 7,669,888 B2 | * | 3/2010 | Sato | B60R 21/207 |
| | | | | 280/730.2 |
| 7,926,840 B1 | | 4/2011 | Choi | |
| 9,296,353 B1 | | 3/2016 | Choi | |
| 9,308,883 B1 | * | 4/2016 | Schneider | B60R 21/231 |

(Continued)

FOREIGN PATENT DOCUMENTS

| | | | | |
|---|---|---|---|---|
| DE | 102014004854 A1 | * | 10/2015 | B60R 21/18 |
| KR | 19990026012 U | | 7/1999 | |

OTHER PUBLICATIONS

Auto Safety article entitled "New airbag technologies help improve rear seat safety," posted on Dec. 3, 2014, printed Oct. 3, 2016, http://safety.trw.com/new-airbag-technologies-help-improve-rear-seat-safety/1203/, © 2016 ZF TRW (2 pages).

*Primary Examiner* — Nicole T Verley
(74) *Attorney, Agent, or Firm* — Frank A. MacKenzie; Bejin Bieneman PLC

(57) ABSTRACT

A seat includes a seatback having an exterior panel. The seat includes a first member and a second member each being inflatable to an inflated position and defining an inflation chamber, the inflation chambers spaced from each other. The exterior panel extends between and is secured to the first member and the second member external to the inflation chambers in the inflated position.

19 Claims, 7 Drawing Sheets

(56) References Cited

U.S. PATENT DOCUMENTS

| | | | |
|---|---|---|---|
| 9,409,539 B2* | 8/2016 | Nagasawa | B60N 2/4228 |
| 9,475,447 B1* | 10/2016 | Whitens | B60N 2/4221 |
| 9,623,826 B2* | 4/2017 | Weng | B60R 21/207 |
| 9,688,232 B1* | 6/2017 | Loew | B60R 21/207 |
| 9,731,675 B2* | 8/2017 | Sadr | B60R 21/23138 |
| 9,919,671 B2* | 3/2018 | Nagasawa | B60N 2/4228 |
| 10,023,146 B2* | 7/2018 | Faruque | B60R 21/207 |
| 10,035,484 B2* | 7/2018 | Jaradi | B60R 21/207 |
| 10,155,495 B2* | 12/2018 | Jaradi | B60R 21/207 |
| 2013/0093224 A1* | 4/2013 | Dainese | B60R 21/207 |
| | | | 297/216.12 |
| 2013/0341975 A1 | 12/2013 | Schneider et al. | |
| 2015/0108744 A1* | 4/2015 | Line | B60N 2/6009 |
| | | | 280/730.2 |
| 2016/0107598 A1 | 4/2016 | Fischer et al. | |

\* cited by examiner

VEHICLE AIRBAG SYSTEM

BACKGROUND

A vehicle may include one or more airbags deployable during vehicle impacts to absorb energy from occupants of the vehicle during the impact. The airbag may be a component of an airbag assembly including a housing supporting the airbag, and an inflation device in communication with the airbag for inflating the airbag from an uninflated position to an inflated position. The airbag assembly may be supported on a steering wheel of the vehicle, an instrument panel of the vehicle, etc.

DETAILED DESCRIPTION

Figure 1:
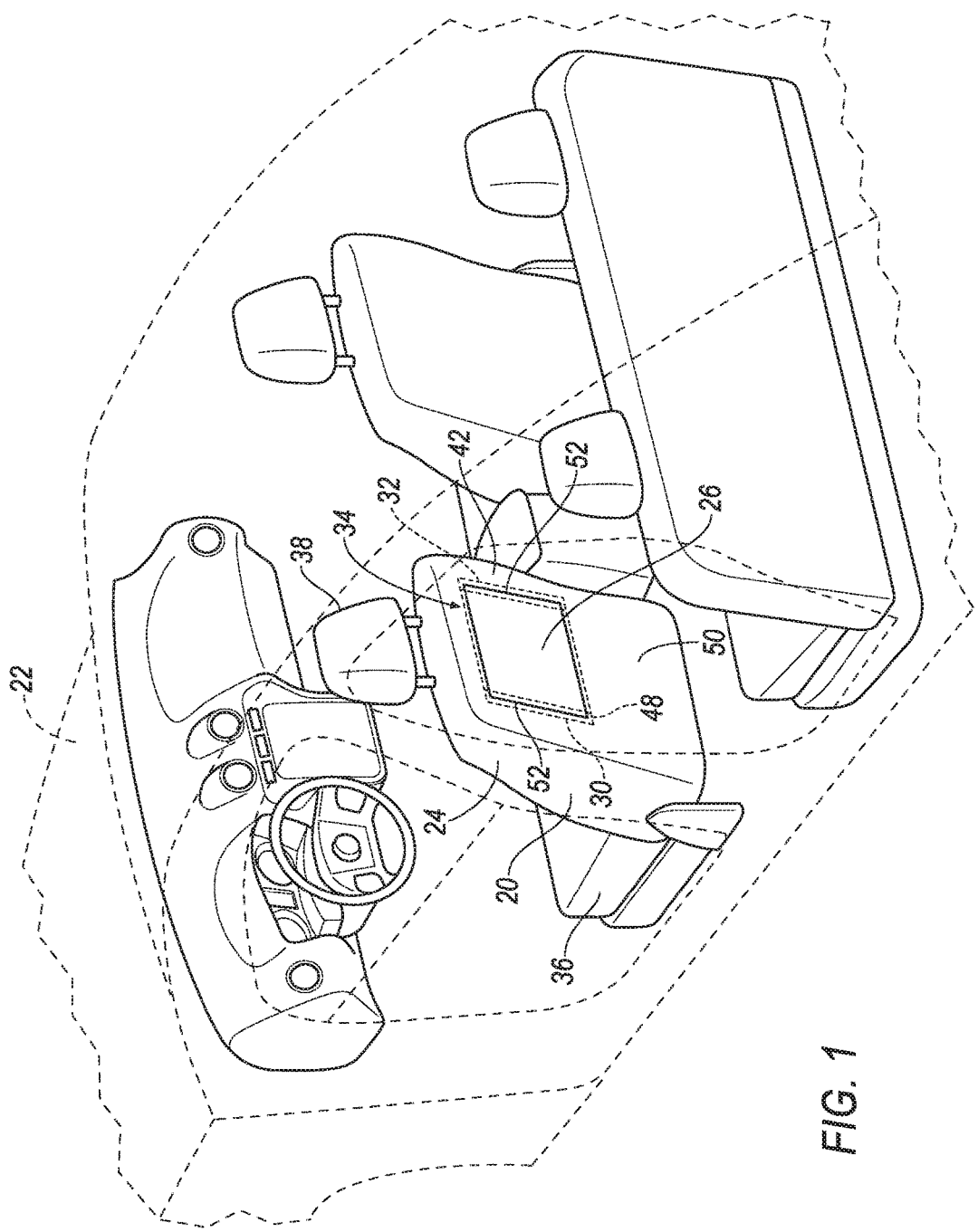
FIG. 1 is a rear side perspective view of a vehicle including an airbag system with members of the airbag system in an uninflated position.
Figure 2:
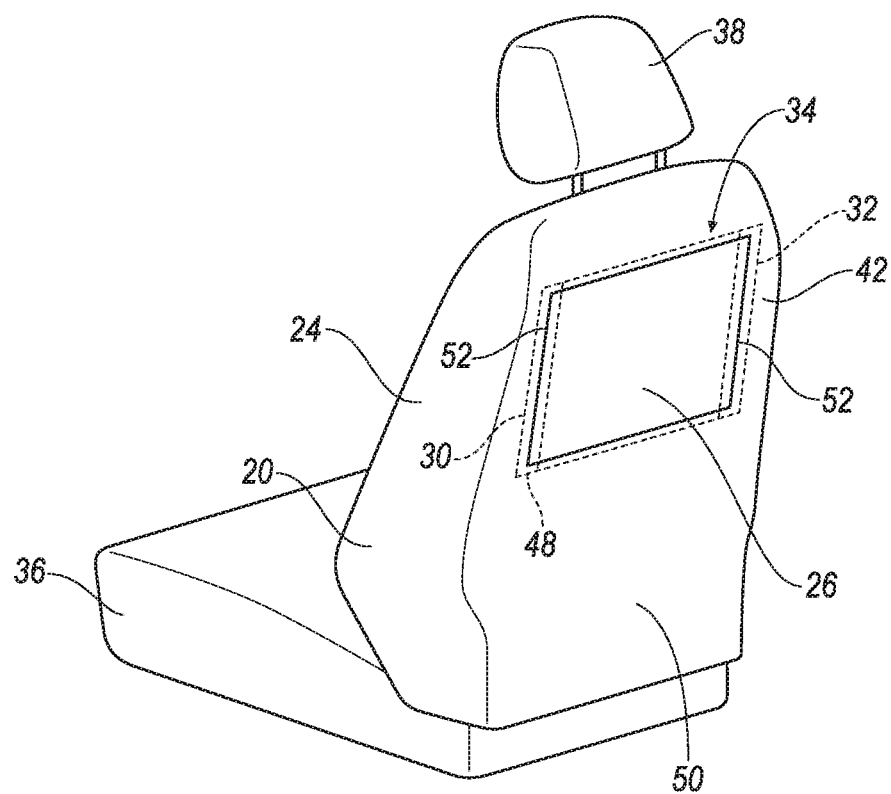
FIG. 2 is a rear side perspective view of a seat of the vehicle including the airbag system with the members in the uninflated position.

A seat includes a seatback having an exterior panel. The seat includes a first member and a second member each being inflatable to an inflated position and defining an inflation chamber, the inflation chambers spaced from each other. The exterior panel extends between and is secured to the first member and the second member external to the inflation chambers in the inflated position.

The seatback may include a second exterior panel spaced from the exterior panel when the first and second members are in the inflated position.

The first and second members may be inflatable from an uninflated position to the inflated position, and the exterior panel may abut the second exterior panel when the first and second members are in the uninflated position.

The exterior panel may be releasably fixed to the second exterior panel when the first and second members are in the inflated position.

The first member in the inflated position may be parallel to the second member in the inflated position.

The seat may include a tether including a first end secured to the exterior panel and a second end secured to the seatback other than to the exterior panel.

The first member and the second member in the inflated position may each have an arcuate shape with a first end and a second end opposite the first end, the first end and the second end may be secured to the seatback.

The arcuate shape of the first member may define an apex located a distance from the seatback. The seat may include a tether including a first end secured to the exterior panel and a second end secured to the seatback other than to the exterior panel and having a length that is less than the distance from the apex to the seatback.

The seatback may define a top-to-bottom axis and the first member and the second member in the inflated position may each extend along the top-to-bottom axis.

The first member in the inflated position may be spaced from the second member in the inflated position by a threshold distance.

The threshold distance may be based on a shoulder width of a standard crash test dummy.

The seat may include a third member inflatable to an inflated position and extending between the first member and the second member in the inflated position.

The seat may include a fourth member inflatable to an inflated position and extending between the first member and the second member in the inflated position and spaced from the third member.

The exterior panel may be between the third member and the fourth member in the inflated position.

An airbag assembly includes a housing. The airbag assembly includes a first member and a second member spaced from the first member, the first member and the second member each supported by the housing and inflatable from an uninflated position to an inflated position. The airbag assembly includes an exterior panel secured to the first member and the second member and disposed outside of the housing and having a class-A surface while the first member and the second member are in the uninflated position.

The exterior panel may be made of fabric.

The exterior panel may be made of leather.

The exterior panel may include an inner layer and an outer layer relative to the housing.

The inner layer may be foam.

The exterior panel may be an upholstered surface.

With reference to the FIGURES, a seat 20 of a vehicle 22 includes a seatback 24 having an exterior panel 26. The seat 20 includes a first member 28 and a second member 30 each being inflatable to an inflated position and defining an inflation chamber 32. The inflation chambers 32 are spaced from each other. The exterior panel 26 extends between, and is secured to, the first member 28 and the second member 30 external to the inflation chambers 32 in the inflated position.

The exterior panel 26, the first member 28, and the second member 30 in the inflated position reduce a likelihood of injury to an occupant of the vehicle 22 seated behind the seatback 24 during an impact of the vehicle 22. For example, the exterior panel 26 may receive and help stabilize a head of the occupant, e.g., reducing potential head, brain, neck, etc., injury.

Figure 8:
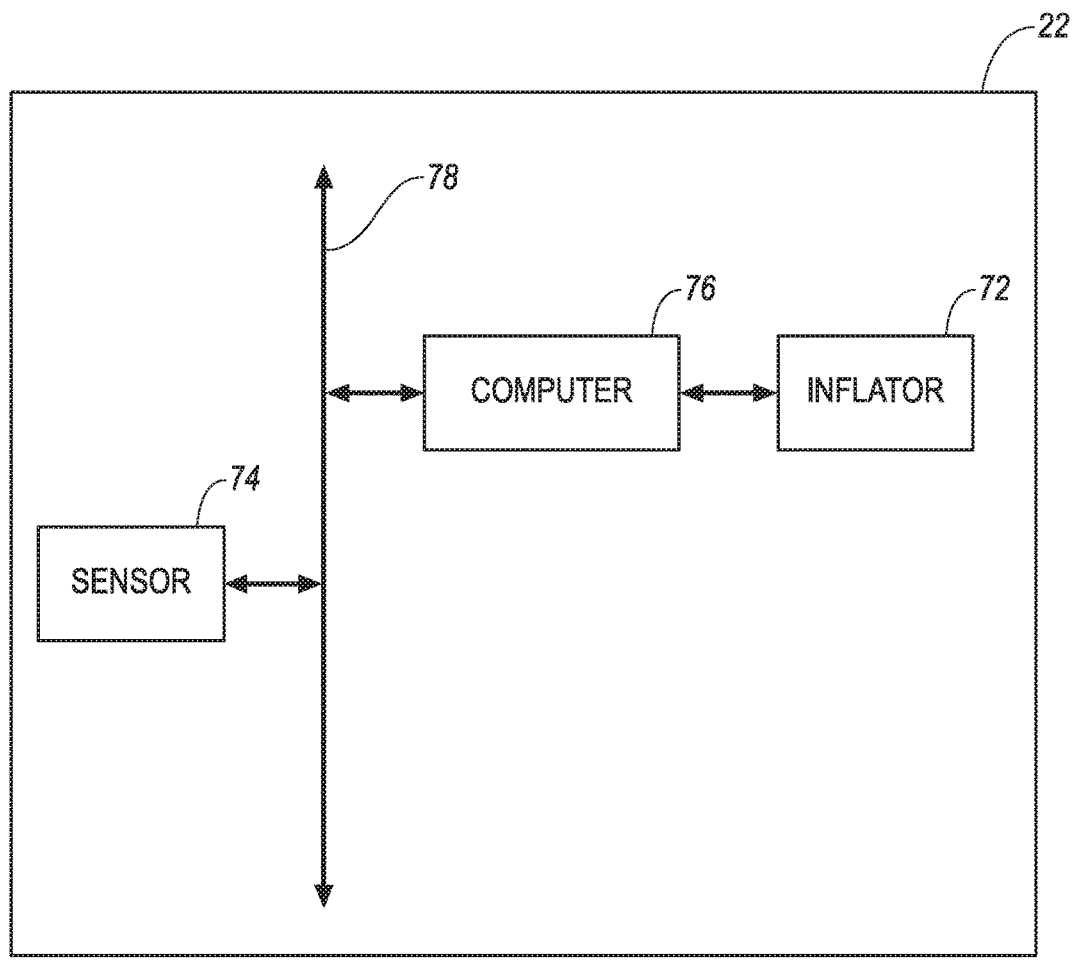
FIG. 8 is a block diagram of components of the vehicle.

The vehicle 22, shown in FIGS. 1 and 8, may be any passenger or commercial automobile such as a car, a truck, a sport utility vehicle, a crossover vehicle, a van, a minivan, a taxi, a bus, etc.

The seat 20, shown in FIGS. 1, 2, and 4-7, may include the seatback 24, a seat bottom 36, and a head restraint 38. The head restraint 38 may be supported by the seatback 24 and may be stationary or movable relative to the seatback 24. The seatback 24 may be supported by the seat bottom 36 and may be stationary or movable relative to the seat bottom 36. The seatback 24, the seat bottom 36, and/or the head restraint 38 may be adjustable in multiple degrees of freedom. Specifically, the seatback 24, the seat bottom 36, and/or the head restraint 38 may themselves be adjustable, in other words, adjustable components within the seatback 24, the seat bottom 36, and/or the head restraint 38, and/or may be adjustable relative to each other.

Figure 3:
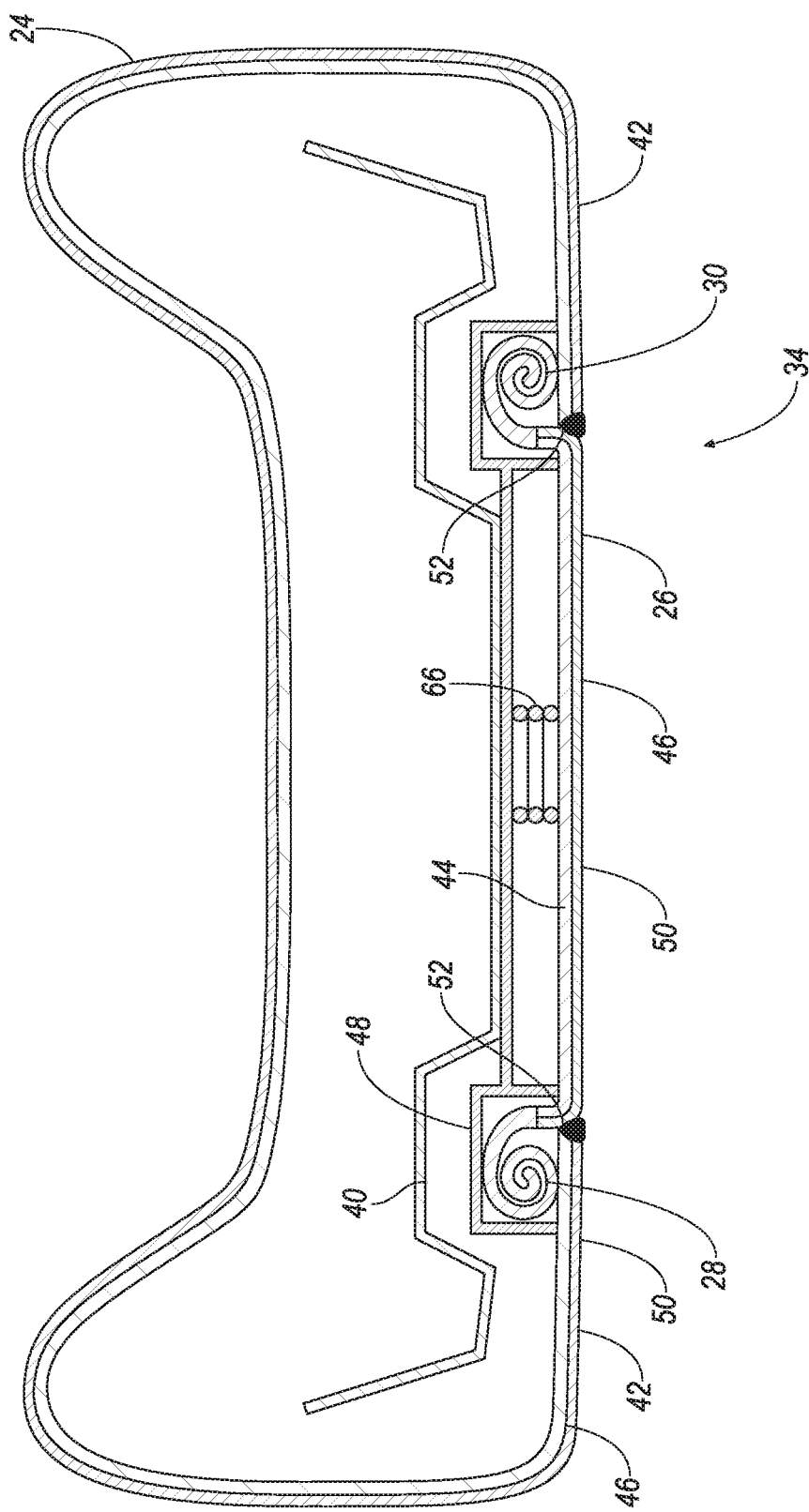
FIG. 3 is a top cross section view of a seatback of the seat including the airbag system with the members in the uninflated position.
Figure 4:
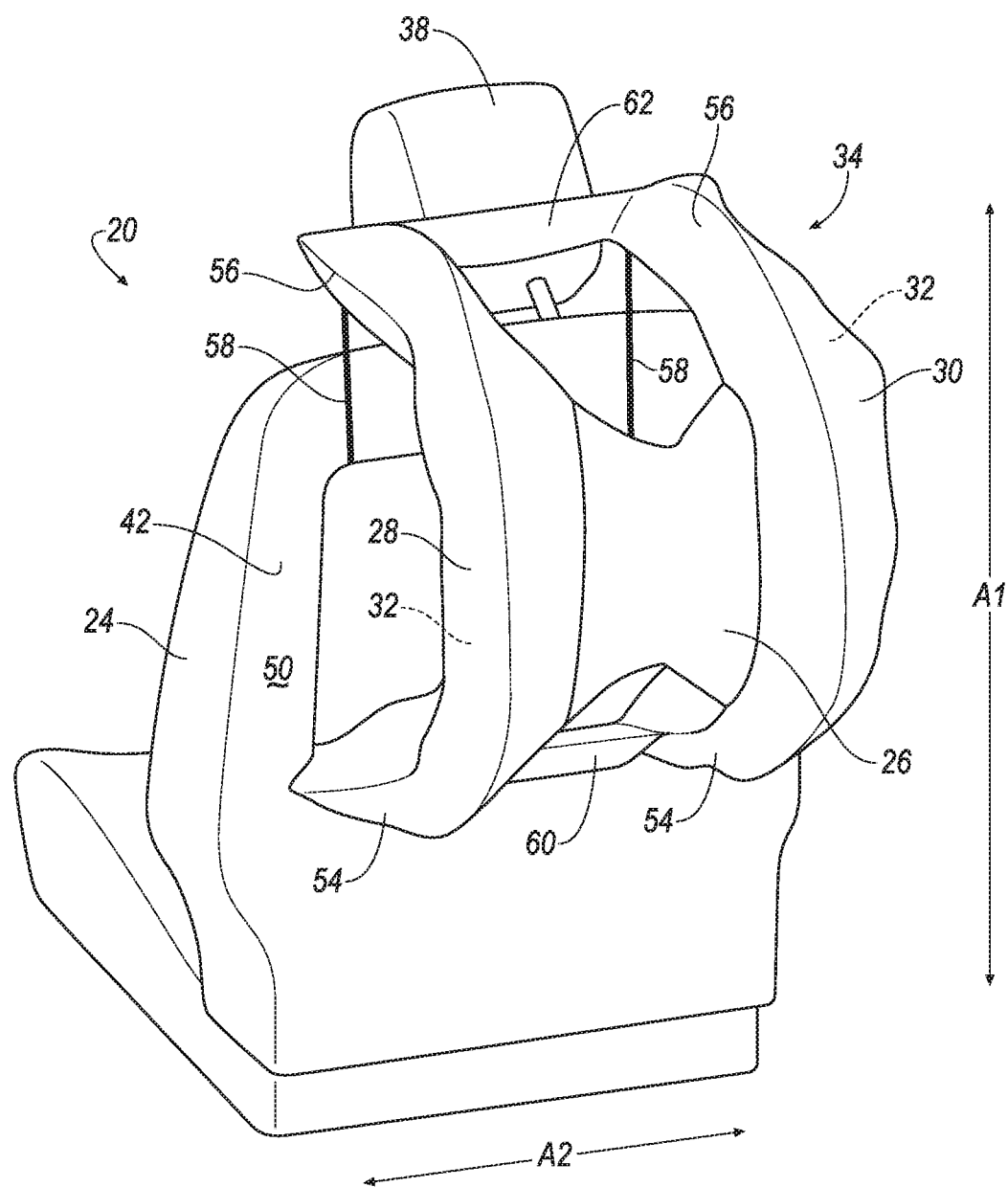
FIG. 4 is a rear side perspective view of the seat of the vehicle including the airbag system with the members in the inflated position.

The seatback 24, shown in FIGS. 1-7, may define a top-to-bottom axis A1, as shown in FIG. 4. The top-to-bottom axis A1 may extend along the seatback 24 between the seat bottom 36 and the head restraint 38. The seatback 24 may define a left-to-right axis A2, also shown in FIG. 4. The left-to-right axis A2 is perpendicular to the top-to-bottom axis A1. The top-to-bottom axis A1 and the left-to-right axis A2 may be defined relative to an intended seating position of an occupant of the seat 20.

The seatback 24 may include a frame 40, as shown in FIG. 3. The frame 40 may include tubes, beams, etc. The frame 40 may be formed of any suitable plastic material, e.g., carbon fiber reinforced plastic (CFRP), glass fiber-reinforced semi-finished thermoplastic composite (organosheet), etc. As another example, some or all components of the frame 40 may be formed of a suitable metal, e.g., steel, aluminum, etc.

The seat 24 includes an airbag assembly 34. The airbag assembly 34 includes the first member 28 and the second member 30. The exterior panel 26 may be a component of both the airbag assembly 34 and the seatback 24. For example, the exterior panel 26 may be secured to the first member 28 and the second member 30 prior to installation of the airbag assembly 34 to the seatback 24; and the exterior panel 26 may be secured to other components of the seatback 24, as described below, when the airbag assembly 34 is assembled to the seatback 24.

The airbag assembly 34 includes an inflator 78, as described below. The airbag assembly 34 may include a housing 48 that supports the first member 28, the second member 30, and the inflator 78. Specifically, the housing 48 may support the first member 28 and the second member 30 in both the uninflated position and the inflated position. The housing 48 may house at least a portion of the first member 28, the second member 30, and/or the inflator 78. In an example where the airbag assembly 34 includes the housing 48, the housing 48 may be fixed to the frame 40 of the seatback 24.

The exterior panel 26, along with one more additional exterior panels 42 cover the frame 40. The exterior panels 26, 42 have a class-A surface, i.e., a surface specifically manufactured to have a high-quality, finished aesthetic appearance free of blemishes. For example, the exterior panels 26, 42 may be upholstered surfaces which provide the seatback 24 with a soft, padded covering. The exterior panels 26, 42 may include an inner layer 44 and an outer layer 46 relative to a housing 48 and/or the seatback 24, as shown in FIG. 3. The exterior panels 26, 42, e.g., the outer layer 46 of the exterior panels 26, 42, may be made of fabric, leather, faux leather, or any other suitable material. The inner layer 44 maybe made of foam or any other suitable material. The inner layer 44 may have a thickness, e.g. 1-5 millimeters. The inner layer 44 may be secured to the outer layer 46, e.g., with stitching, adhesive, as a laminate, etc.

The exterior panel 26 abuts one more of the additional exterior panels 42 when the first and the second members 28, 30 are in the uninflated position. For example, the exterior panel 26 and one or more of the additional exterior panels 42 may provide a back surface 50 to the seatback 24 and be located adjacent each other. The exterior panel 26 maybe releasably fixed to one more of the additional exterior panels 42. For example, stitching 52 may secure the exterior panel 26 to one more of the additional exterior panels 42. The stitching 52 may be configured to tear upon application of a threshold amount of force to the exterior panel 26, such as that applied during inflation of the first and the second members 28, 30, e.g., the stitching 52 may have a certain tensile strength.

The first member 28 and the second member 30 are each inflatable from the uninflated position to the inflated position. The exterior panel 26 is secured to the first member 28 and the second member 30 in the uninflated position and in the inflated position. For example, the first member 28 and the second member 30 may be secured to the exterior panel 26 via stitching, adhesive, etc. The exterior panel 26 is disposed outside of the housing 48 while the first member 28 and the second member 30 are in the uninflated position.

The exterior panel 26 extends between, and is secured to, the first member 28 and the second member 30 external to the inflation chambers 32 in the inflated position, e.g., via stitching, adhesive, etc. The exterior panel 26 is spaced from the one or more additional exterior panels 42 when the first and the second members 28, 30 are in the inflated position. For example, inflation of the first member 28 and the second member 30 causes the exterior panel 26 to move from abutting the one or more additional exterior panels 42 to being spaced the from the one or more additional exterior panels 42.

The first member 28 and the second member 30 may be formed of a woven polymer or any other material. As one example, the first member 28 and the second member 30 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The first member 28 and the second member 30 each define one of the inflation chambers 32. For example, the first member 28 and the second member 30 in the inflated position may be tubular and surround their respective inflation chamber 32.

The first member 28 and the second member 30 may each be supported by the housing 48 and/or the seatback 24. For example, the first member 28 and the second member 30 may each include a first end 54 and a second end 56. The first end 54 may be spaced from the second end 56. The first end 54 and the second end 56 may be secured to the seatback 24 and/or the housing 48. The ends 54, 56 of the first and the second members 28, 30 may be directly secured, and/or secured with a tether 58, e.g., connecting the first end 54 or the second end 56 to the seatback 24 and/or housing 48.

The inflation chambers 32 are spaced from each other. For example, the exterior panel 26 may be disposed between the first member 28 and the second member 30 in the inflated position, spacing the inflation chamber 32 of the first member 28 from the inflation chamber 32 of the second chamber. The inflation chambers 32 may be in fluid communication with each other, e.g., via tubing, a third member 60, a fourth member 62, etc. The third and the fourth members 60, 62 are described below.

Figure 5:
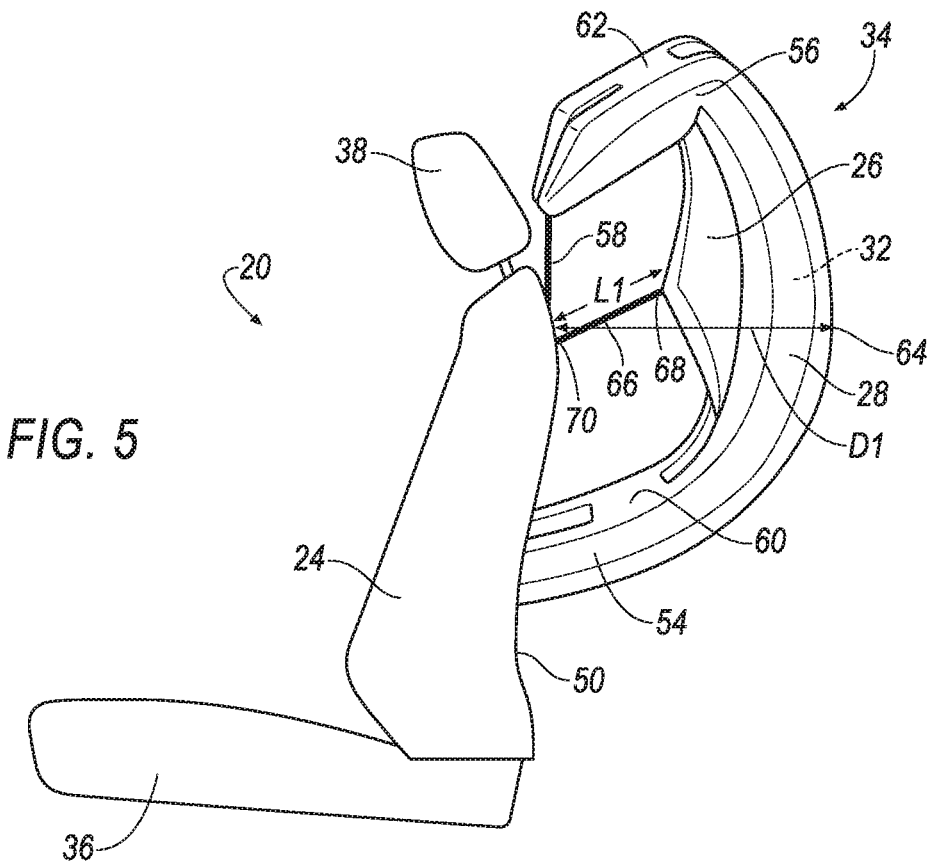
FIG. 5 is a side view of the seat of the vehicle including the airbag system with the members in the inflated position.
Figure 6:
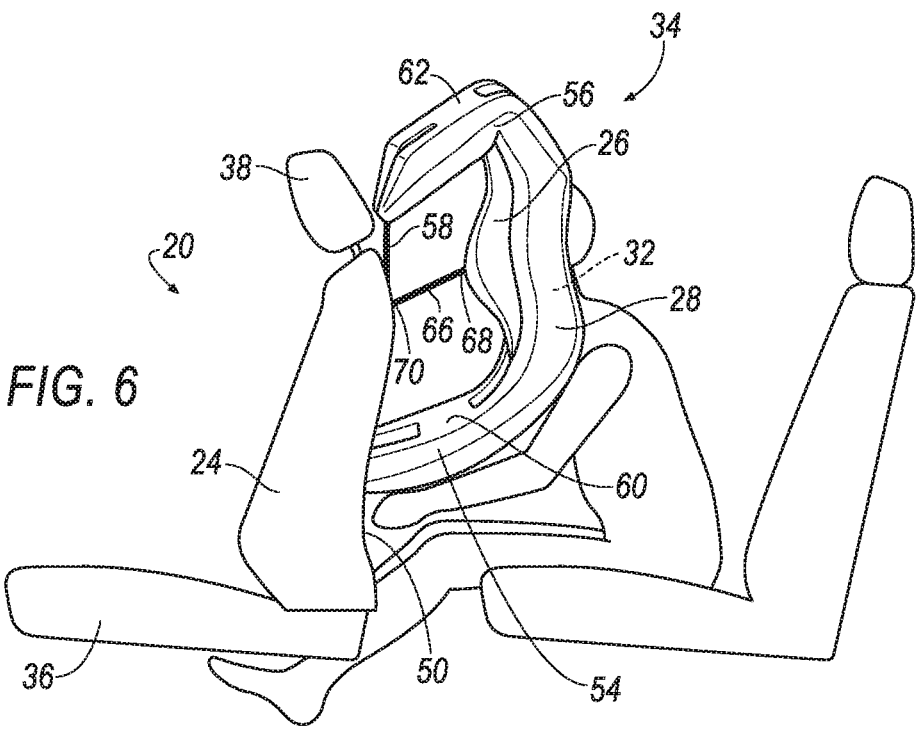
FIG. 6 is a side view of the seat of the vehicle including the airbag system with the members in the inflated position and an occupant of the vehicle contacting an exterior panel.

The first member 28 and the second member 30 in the inflated position each have an arcuate shape with the first end 54 opposite the second end 56. For example, the first member 28 and the second member 30 in the inflated position may be elongated in a curved manner to form a C-shape, as shown in FIG. 5. For example, the C-shape of the first member 28 may start where the first end 54 is secured to the housing 48 and/or seatback 24, with the first member 28 elongating away from the seatback 24 and/or housing 48, then curving upward toward the head restraint 38, and finally curving back toward the seatback 24 and/or housing 48 to where the second end 56 is secured.

The arcuate shape of the first member 28 defines an apex 64 located a distance D1 from the seatback 24, as shown in FIG. 5. The distance D1 may be defined in a direction normal to the back surface 50 of the seatback 24, e.g., perpendicular to both the top-to-bottom axis A1 and the left-to-right axis A2.

Figure 7:
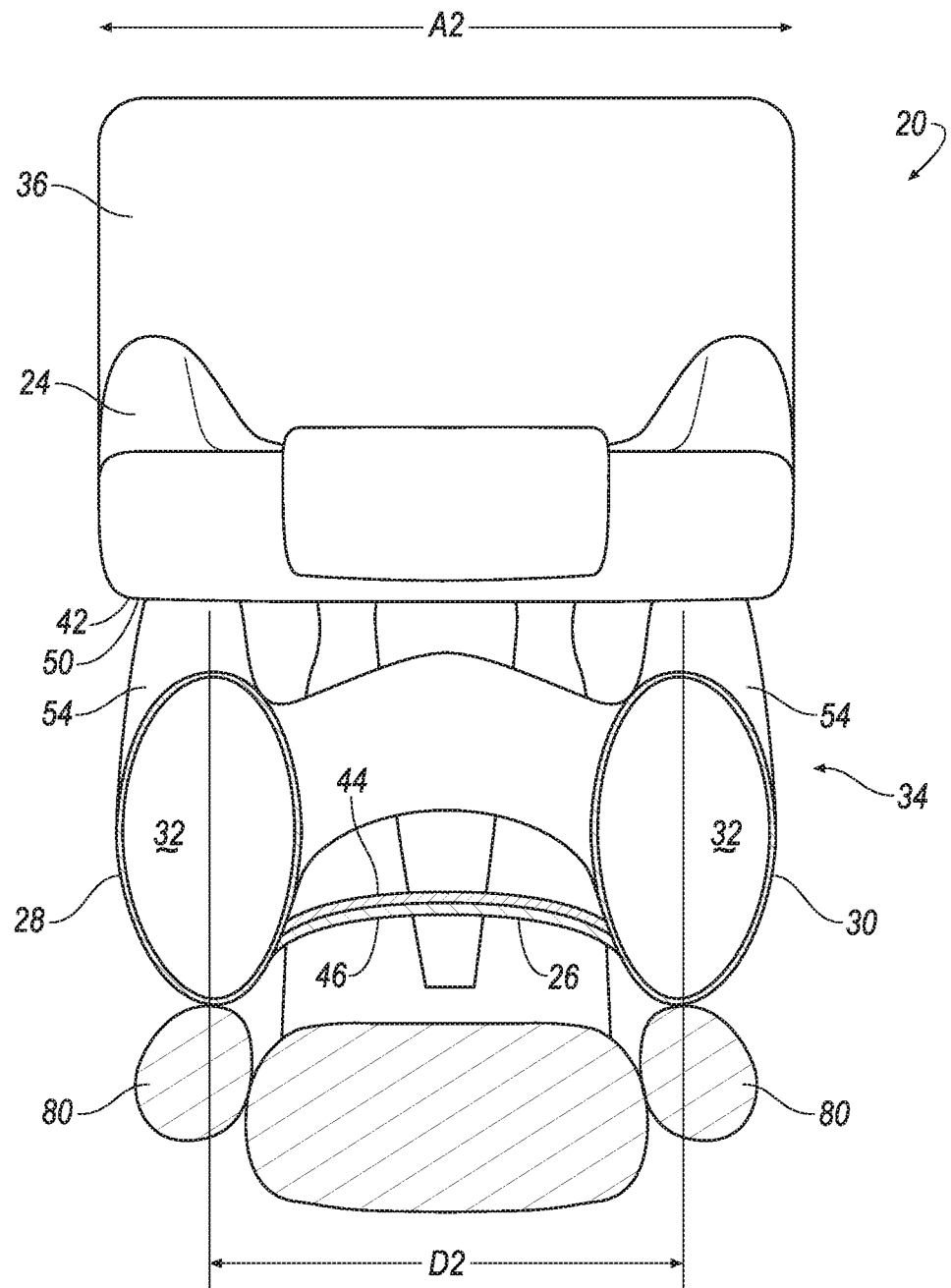
FIG. 7 is a top view of the seat including the airbag system with a top cross section view of the members in the inflated position.

The first member 28 in the inflated position may be spaced from the second member 30 in the inflated position by a threshold distance D2 as shown in FIG. 7. The space from the first member 28 to the second member 30 may be defined along the left-to-right axis A2 of the seatback 24. The space from the first member 28 to the second member 30 may be defined at the apex 64.

The threshold distance D2 may be based on a width between shoulders 80 of a standard crash test dummy, e.g., a Hybrid III $50^{th}$ percentile male dummy. For example, the first member 28 in the inflated position may be spaced from the second member 30 in the inflated position such that the first and the second members 28, 30 align with the shoulders 80 of the standard crash test dummy, as shown in FIG. 7.

The first member 28 in the inflated position is parallel to the second member 30 in the inflated position. For example, the C-shape of the first member 28 may define a plane, and the C-shape of the second member 30 in the inflated position may define a plane that is parallel to the plane of the first member 28. As another example, the first member 28 and the second member 30 in the inflated position each extend along the top-to-bottom axis A1 of seatback 24, e.g., the first end 54 may be located directly above the second end 56 relative to the left-to-right axis A2 of seatback 24, with the first and second members 28, 30 spaced from each other by the threshold distance D2 along the entire extension of the first and second members 28, 30.

The airbag assembly 34 may include the third member 60. The third member 60 may be inflatable to an inflated position and extend between the first member 28 and the second member 30 in the inflated position. The third member 60 may be in fluid communication the first member 28 and/or the second member 30. The third member 60 may be secured to the first member 28 and/or the second member 30, e.g., via stitching, adhesive, etc. The third member 60 in the inflated position may be located closer to the first ends 54 of the first member 28 and the second member 30 than to the second ends 56 of the first member 28 and the second member 30.

The airbag assembly 34 may include the fourth member 62. The fourth member 62 may be inflatable to an inflated position and extend between the first member 28 and the second member 30 in the inflated position. The fourth member 62 may be in fluid communication the first member 28 and/or the second member 30. The fourth member 62 may be secured to the first member 28 and/or the second member 30, e.g., via stitching, adhesive, etc. The fourth member 62 may be spaced from the third member 60. For example, the fourth member 62 in the inflated position may be located closer to the second ends 56 of the first member 28 and the second member 30 than to the first ends 54 of the first member 28 and the second member 30. The exterior panel 26 may be located between the third member 60 and the fourth member 62 in the inflated position. The exterior panel 26 may be spaced from the third member 60 and the fourth member 62 in the inflated position.

The airbag assembly 34 may include a tether 66. The tether 66 may include a first end 68 and a second end 70 spaced from the first end 68. The first end 68 may be secured to the exterior panel 26, e.g., with stitching, adhesive, etc. The second end 70 may be secured to the seatback 24 other than to the exterior panel 26, for example the second end 70 may be secured to the frame 40 of the seatback 24, e.g., with a fastener, adhesive, etc. Additionally or alternately, the second end 56 may be secured to the housing 48. The tether 66 may have a length L1 that is less than the distance D1 from the apex 64 to the seatback 24. The length L1 of the tether 66 may be defined between where the first end 54 is secured to the exterior panel 26 and where the second end 56 is secured to the seatback 24 and/or the housing 48, as shown in FIG. 5.

The tether 66 provides a recessed shape to the exterior panel 26 when the members 28, 30, 60, 62 are in the inflated position. During an impact to the vehicle 22, a head of an occupant seated behind the seatback 24 is received in the recessed shape of the exterior panel 26, thereby helping to stabilize the head of the occupant and reduce a likelihood of injury.

The housing 48 may contain one or more of the members 28, 30, 60, 62 in the uninflated position. The housing 48 provides a reaction surface for the members 28, 30, 60, 62 in the inflated position. The housing 48 may be supported by the seatback 24. For example, the housing 48 may be secured to the frame 40, e.g., with a fastener. The housing 48 may be formed of any suitable material, e.g., a rigid polymer, a metal, a composite, etc.

As shown in FIG. 8, the inflator 72 may be in fluid communication with the members 28, 30, 60, 62, e.g., directly, through various piping, etc. The inflator 72 may be, for example, a pyrotechnic inflator that uses a chemical reaction to drive inflation medium to the members. The inflator 72 may be of any suitable type, for example, a cold-gas inflator. The inflator 72 may be supported by the housing 48, the seatback 24, or by any other suitable location of the vehicle 22.

The vehicle 22 may include at least one impact sensor 74 for sensing impact of the vehicle 22, and a computer 76 in communication with the impact sensor 74 and the inflator 72, shown in FIG. 8. The computer 76 may activate the inflator 72, e.g., provide an impulse to a pyrotechnic charge of the inflator 72 when the impact sensor 74 senses an impact of the vehicle 22. Alternatively or additionally to sensing impact, the impact sensor 74 may be configured to sense impact prior to impact, i.e., pre-impact sensing.

The impact sensor 74 may be in communication with the computer 76. The impact sensor 74 is configured to detect an impact to the vehicle 22. The impact sensor 74 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 74 may be located at numerous points in or on the vehicle 22.

The computer 76 and the impact sensor 74 may be connected to a communication bus 78, such as a controller area network (CAN) bus, of the vehicle 22. The computer 76 may use information from the communication bus 78 to control the activation of the inflator 72. The inflator 72 may be connected directly to the computer 76, as shown in FIG. 8, or the inflator 72 may be connected via the communication bus 78.

The computer 76 may be a microprocessor-based computer 76 implemented via circuits, chips, or other electronic components. For example, the computer 76 may include a processor, a memory, etc. The memory of the computer 76 may include memory for storing programming instructions executable by the processor as well as for electronically storing data and/or databases.

In operation, the members 28, 30, 60, 62 are in the uninflated position under normal operating conditions of the vehicle 22. In the event of an impact, e.g., a front impact, the impact sensor 74 may detect the impact and transmit a signal through the communication bus 78 to the computer 76. The computer 76 may transmit a signal through the communication bus 78 to the inflator 72. Upon receiving the signal, the inflator 72 may discharge and inflate the members 28, 30, 60, 62 with the inflation medium from the uninflated position to the inflated position.

During the impact, momentum of an occupant seated behind the seat 20 may cause the occupant to move forward toward the seat 20. A head of such occupant is received by the exterior panel 26, and shoulders of the occupant abut the first member 28 and the second member 30, thereby helping to reduce movement and absorb energy from the momentum of the occupant. The third and fourth members 60, 62 help to stabilizes the first member 28 and the second member 30 to increase the efficiency of the first member 28 and the second member 30.

The adjectives "first," "second," "third," and "fourth" are used throughout this document as identifiers and are not intended to signify importance or order.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seat comprising:
   a seatback having an exterior panel;
   a first member and a second member each being inflatable to an inflated position and defining an inflation chamber, the inflation chambers spaced from each other;
   the exterior panel extending between and secured to the first member and the second member external to the inflation chambers in the inflated position; and
   a tether including a first end secured to the exterior panel and a second end secured to the seatback other than to the exterior panel.

2. The seat of claim 1, wherein the seatback incudes a second exterior panel spaced from the exterior panel when the first and second members are in the inflated position.

3. The seat of claim 2, wherein the first and second members are inflatable from an uninflated position to the inflated position, and the exterior panel abuts the second exterior panel when the first and second members are in the uninflated position.

4. The seat of claim 3, wherein the exterior panel is releasably fixed to the second exterior panel when the first and second members are in the uninflated position.

5. The seat of claim 1, wherein the first member in the inflated position is parallel to the second member in the inflated position.

6. The seat of claim 1, wherein the seatback defines a top-to-bottom axis and the first member and the second member in the inflated position each extend along the top-to-bottom axis.

7. The seat of claim 1, wherein the first member in the inflated position is spaced from the second member in the inflated position by a threshold distance.

8. The seat of claim 7, wherein the threshold distance is based on a shoulder width of a standard crash test dummy.

9. The seat of claim 1, further comprising a third member inflatable to an inflated position and extending between the first member and the second member in the inflated position.

10. The seat of claim 9, further comprising a fourth member inflatable to an inflated position and extending between the first member and the second member in the inflated position and spaced from the third member.

11. The seat of claim 10, wherein the exterior panel is between the third member and the fourth member in the inflated position.

12. An airbag assembly comprising:
    a housing;
    a first member and a second member spaced from the first member, the first member and the second member each supported by the housing and inflatable from an uninflated position to an inflated position, the first member in the inflated position is spaced from the second member in the inflated position by a threshold distance based on a shoulder width of a standard crash test dummy such that the shoulders of the standard crash test dummy contact the first member and the second member and a head of the standard crash test dummy fits between the first member and the second member; and
    an exterior panel secured to the first member and the second member and disposed outside of the housing and having a class-A surface while the first member and the second member are in the uninflated position.

13. The airbag assembly of claim 12, wherein the exterior panel is made of fabric.

14. The airbag assembly of claim 12, wherein the exterior panel is made of leather.

15. The airbag assembly of claim 12, wherein the exterior panel includes an inner layer and an outer layer relative to the housing.

16. The airbag assembly of claim 15, wherein the inner layer is foam.

17. The airbag assembly of claim 12, wherein the exterior panel is an upholstered surface.

18. A seat comprising:
    a seatback having an exterior panel;
    a first member and a second member each being inflatable to an inflated position and defining an inflation chamber, the inflation chambers spaced from each other; and
    the exterior panel extending between and secured to the first member and the second member external to the inflation chambers in the inflated position;
    wherein the first member and the second member in the inflated position each have an arcuate shape with a first end and a second end opposite the first end, the first end and the second end secured to the seatback.

19. The seat of claim 18, wherein the arcuate shape of the first member defines an apex located a distance from the seatback, and further comprising a tether including a first end secured to the exterior panel and a second end secured to the seatback other than to the exterior panel and having a length that is less than the distance from the apex to the seatback.

* * * * *